United States Patent
Elias

(10) Patent No.: US 9,309,013 B2
(45) Date of Patent: Apr. 12, 2016

(54) PROCESS AND APPARATUS FOR PACKAGING POTATO CRISPS, AS WELL AS THE PACKAGE OBTAINED

(76) Inventor: Michael Joseph Elias, Dublin (IE)

(*) Notice: Subject to any disclaimer, the term of this patent is extended or adjusted under 35 U.S.C. 154(b) by 79 days.

(21) Appl. No.: 13/127,611

(22) PCT Filed: Nov. 5, 2009

(86) PCT No.: PCT/EP2009/064706
§ 371 (c)(1),
(2), (4) Date: May 4, 2011

(87) PCT Pub. No.: WO2010/052279
PCT Pub. Date: May 14, 2010

(65) Prior Publication Data
US 2011/0206812 A1   Aug. 25, 2011

(30) Foreign Application Priority Data
Nov. 7, 2008 (IE) .................................... S2008/0894

(51) Int. Cl.
| B65B 1/08 | (2006.01) |
|---|---|
| B65B 5/06 | (2006.01) |
| B65B 1/22 | (2006.01) |
| B65D 77/00 | (2006.01) |

(52) U.S. Cl.
CPC . *B65B 5/064* (2013.01); *B65B 1/22* (2013.01); *B65D 77/003* (2013.01)

(58) Field of Classification Search
CPC ................ B65B 1/30; B65B 1/08; B65B 1/04
USPC ........... 53/428, 437, 467, 473, 247, 249, 250, 53/173, 484; 426/124; 222/379, 464.5; 221/65, 263
See application file for complete search history.

(56) References Cited

U.S. PATENT DOCUMENTS

| 1,398,840 A | * | 11/1921 | Conley ........................ 206/273 |
|---|---|---|---|
| 1,433,801 A | * | 10/1922 | Conley ........................ 229/87.01 |
| 1,973,391 A | * | 9/1934 | Reynolds et al. .......... 229/87.13 |
| 2,085,680 A | * | 6/1937 | Grace, Jr. ...................... 229/246 |
| 2,348,509 A | | 5/1944 | Wheeler |
| 2,683,561 A | | 3/1954 | Rice |
| 2,705,585 A | | 4/1955 | Wise |

(Continued)

FOREIGN PATENT DOCUMENTS

| CA | 2 465 185 A1 | 10/2005 |
|---|---|---|
| CA | 2 484 864 A1 | 10/2005 |

(Continued)

OTHER PUBLICATIONS

International Preliminary Report on Patentability together with the Written Opinion dated May 10, 2011, issued in corresponding International Application No. PCT/EP2009/064706.

(Continued)

*Primary Examiner* — Gloria R Weeks
(74) *Attorney, Agent, or Firm* — Scully Scott Murphy and Presser

(57) ABSTRACT

A process for packing potato crisps (5) into a box (12) with a base and side-walls, with the steps of dispensing potato crisps into the box; shaking the box (12) to settle the potato crisps (5) in the box; and foil-wrapping the box. The invention also relates to apparatus for carrying out the method and a pack so formed.

12 Claims, 8 Drawing Sheets

(56) References Cited

U.S. PATENT DOCUMENTS

| | | | | |
|---|---|---|---|---|
| 2,899,783 A * | 8/1959 | Otto | | 53/502 |
| 2,946,168 A * | 7/1960 | Manwaring et al. | | 53/230 |
| 3,812,643 A | 5/1974 | Vergobbi | | |
| 3,916,030 A | 10/1975 | Bard et al. | | |
| 3,967,434 A * | 7/1976 | Mancini | | 53/564 |
| 3,988,875 A * | 11/1976 | Fay | | 53/514 |
| 3,994,321 A * | 11/1976 | Eisenberg | | 141/1 |
| 4,052,838 A | 10/1977 | Hilton et al. | | |
| 4,084,390 A * | 4/1978 | Schmachtel et al. | | 53/511 |
| 4,089,255 A * | 5/1978 | Akoh et al. | | 493/76 |
| 4,094,123 A * | 6/1978 | Carlson | | 53/436 |
| 4,142,560 A * | 3/1979 | Eisenberg | | 141/12 |
| 4,198,166 A * | 4/1980 | Tuns | | 366/112 |
| 4,269,861 A * | 5/1981 | Caridis et al. | | 426/438 |
| 4,351,141 A | 9/1982 | Glorfield et al. | | |
| 4,467,845 A * | 8/1984 | Strand et al. | | 141/10 |
| 4,519,179 A * | 5/1985 | Meier | | 53/236 |
| 4,565,050 A * | 1/1986 | Norris | | 53/491 |
| 4,566,253 A | 1/1986 | Jones | | |
| 4,578,929 A * | 4/1986 | Tisma | | 53/525 |
| 4,779,402 A * | 10/1988 | Duynhoven et al. | | 53/529 |
| 4,922,688 A * | 5/1990 | Langen et al. | | 53/525 |
| 4,955,178 A * | 9/1990 | Shroyer | | 53/148 |
| 4,987,727 A * | 1/1991 | McClusky et al. | | 53/525 |
| 5,007,227 A * | 4/1991 | McClusky et al. | | 53/243 |
| 5,125,213 A | 6/1992 | Focke et al. | | |
| 5,236,507 A * | 8/1993 | Brown | | 118/707 |
| 5,452,564 A | 9/1995 | Staats | | |
| 5,499,484 A * | 3/1996 | Herrin | | 53/458 |
| 5,732,532 A * | 3/1998 | Fujisaki et al. | | 53/451 |
| 5,741,535 A | 4/1998 | Cope et al. | | |
| 6,099,674 A * | 8/2000 | Hoffman | | 156/217 |
| 6,119,438 A * | 9/2000 | Bacon et al. | | 53/451 |
| 6,206,279 B1 * | 3/2001 | Countee | | 229/117.27 |
| 6,213,388 B1 * | 4/2001 | Ours et al. | | 229/117.3 |
| 6,463,720 B1 * | 10/2002 | Cherney et al. | | 53/437 |
| 6,474,040 B1 * | 11/2002 | Ours et al. | | 53/133.3 |
| 6,672,037 B2 * | 1/2004 | Wehrmann | | 53/472 |
| 6,718,739 B2 * | 4/2004 | Kohl et al. | | 53/551 |
| 6,892,513 B1 * | 5/2005 | Barr et al. | | 53/458 |
| 6,918,532 B2 * | 7/2005 | Sierra-Gomez et al. | | 229/87.08 |
| 7,117,653 B2 * | 10/2006 | Yakushigawa et al. | | 53/53 |
| 7,553,064 B2 * | 6/2009 | Johnson et al. | | 366/109 |
| 8,028,503 B2 * | 10/2011 | Capodieci | | 53/479 |
| 8,162,010 B2 * | 4/2012 | Pagani | | 141/71 |
| 8,511,048 B2 * | 8/2013 | Smith | | 53/575 |
| 2003/0057266 A1 * | 3/2003 | Sedo | | 229/215 |
| 2006/0070352 A1 * | 4/2006 | Momich | | 53/437 |
| 2010/0326016 A1 * | 12/2010 | Smith | | 53/449 |
| 2011/0206812 A1 * | 8/2011 | Elias | | 426/124 |
| 2011/0239595 A1 * | 10/2011 | Jones | | 53/473 |

FOREIGN PATENT DOCUMENTS

| | | |
|---|---|---|
| EP | 0249260 A | 12/1987 |
| EP | 0 590 708 A1 | 4/1994 |
| EP | 1 270 416 A1 | 1/2003 |
| EP | 1 454 827 A2 | 9/2004 |
| EP | 1 719 430 A1 | 11/2006 |
| EP | 1 767 465 A1 | 3/2007 |
| EP | 1 840 033 A2 | 10/2007 |
| FR | 1327914 A | 4/1963 |
| GB | 582276 A | 11/1946 |
| GB | 1 195 136 | 6/1970 |
| GB | 2 228 912 A | 9/1990 |
| GB | 2350597 A | 12/2000 |
| GB | 2 379 647 A | 3/2003 |
| WO | WO 94/18090 A1 | 8/1994 |
| WO | WO 97/41032 A2 | 11/1997 |
| WO | WO 00/48905 A1 | 8/2000 |
| WO | 2008/086388 A | 7/2008 |

OTHER PUBLICATIONS

International Search Report dated Mar. 26, 2010, issued in corresponding International Application No. PCT/EP2009/064706.
European Breakfast Cereal Association, "Responsible packaging for breakfast cereals", Available from: http://www.konsument.at/cs/util/getDownload.jsp?param=39ced8b1db5820b4c41fee27a5e7e8a-87e6699a22d5cba04961bae1831, May 3, 2014.
Notice of Opposition issued in European Patent Application No. EP 2358595 on Jun. 5, 2013.
Submission in Opposition Proceedings issued in European Patent No. EP 2358595 dated Oct. 1, 2015.

* cited by examiner

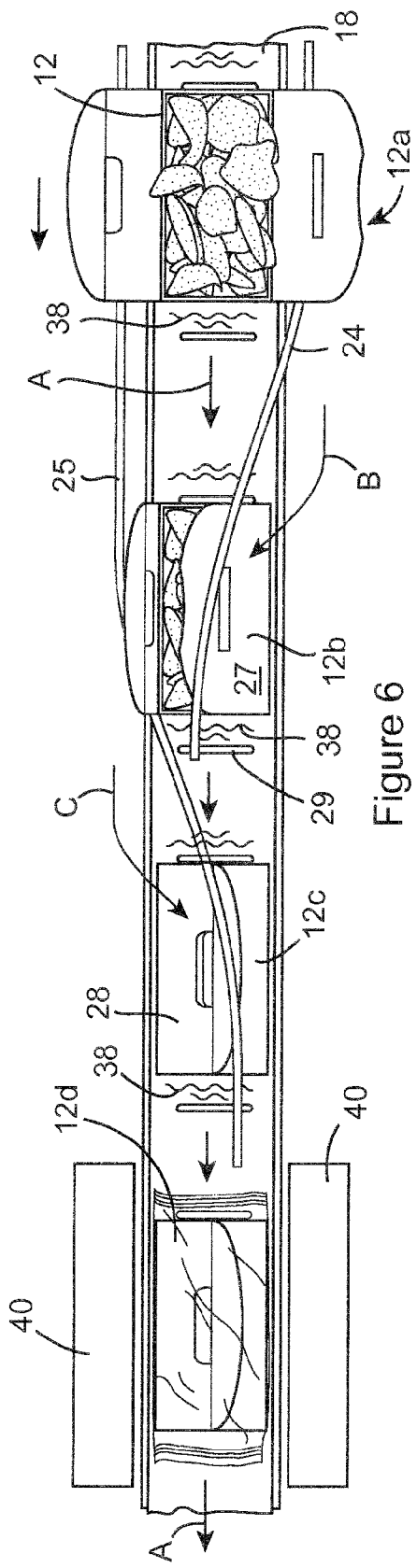
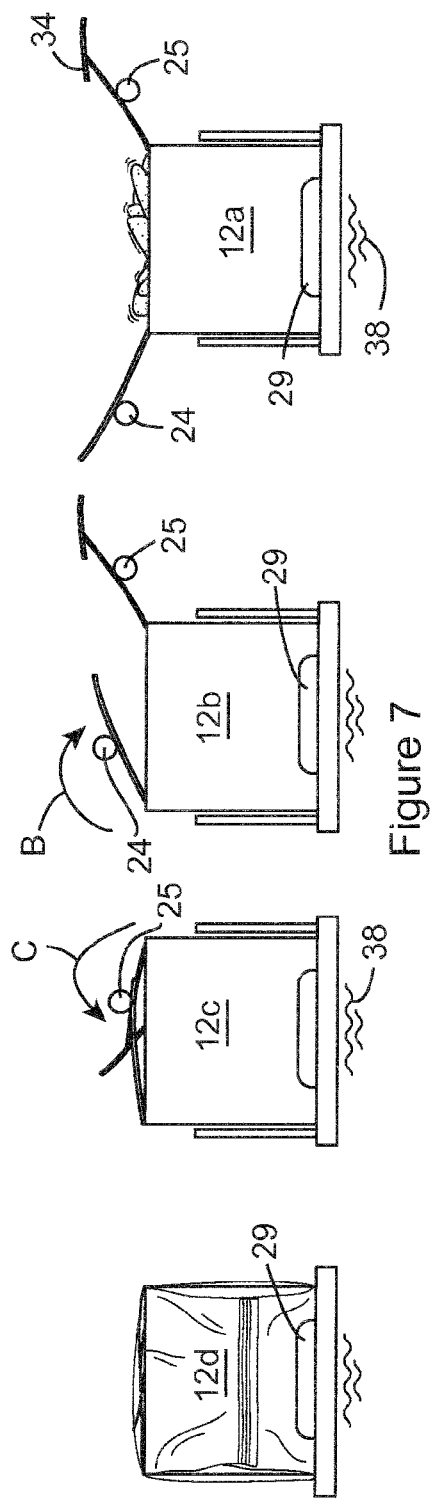

PROCESS AND APPARATUS FOR PACKAGING POTATO CRISPS, AS WELL AS THE PACKAGE OBTAINED

FIELD OF THE INVENTION

The present invention relates to the process of packaging potato crisps and an apparatus and pack therefor.

BACKGROUND TO THE INVENTION

This invention relates to the process for packing potato crisps into a container.

Generally, potato crisps are packaged into plastic tube bags in an upright position and sealed using a closure seam. Prior to sealing, the plastic tube bag is generally filled with a gas such as air or nitrogen gas to both protect the product from being crushed and maintain the freshness of the product by preventing oxidation during storage. The inflated, sealed tube plastic bag acts like a pillow or cushion, which is capable of receiving a certain level of applied pressure without the bag bursting and without the product therein being crushed. A typical bag of crisps is shown in FIG. 1A.

The problem associated with the packaging of potato crisps in this manner is that it is common for the product to be in the region of the closure portion of the bag. As such, it is difficult to apply to the closure seam by means of a thermal seal when such product lies across the closure portion of the bag.

A solution implemented to solve the problem associated with the above process includes the use of vibrations from air oscillations during the tube bag loading process. This results in a fast and convenient means to load the product into a tube bag, and ensures that residues from the product are removed from the closure seam region. Therefore, when the sealing means is applied to the product-loaded tube bag, the bag is successfully sealed and the absence of product residue at the sealing region ensures that the bag is correctly sealed.

However, when the potato crisps are dropped into the bag from a vertical position and/or the bag is vibrated, the product tends to congregate at the bottom of the bag, which results in a thicker and less uniformly spread volume of product within the bag. When the bag is inflated with nitrogen gas, the "cushion" formed therein will be less likely to protect the product from damage during packaging and storage as the volume of the product is not uniform throughout the area of the inflated bag. As such, during the usual test procedure for packaged potato crisps, whereby the inflated sealed bag is compressed between two flat surfaces to determine if the bag is inflated to industry standards, the uneven distribution of the potato crisps leads to the product being crushed during testing.

An issue also is the amount of space taken up by the protective atmosphere. It is estimated that a substantial portion of the volume packed for shipping is given over to accommodating the atmosphere rather than product. Snack foods have been developed which overcome this problem. Typically such snacks are reconstituted foods, which are made to a specific shape, for example crisps such as those sold as Pringles™, and are shaped for nesting together in a compact arrangement. While such products do allow for more efficient packaging (because the food items being regularly shaped fit together without any lost space) they are not suitable for non-reconstituted potato crisps which are different in size and shape to begin with (because they come from differently sized and shaped potatoes) and which become even more non-uniform in shape while being fried.

A purpose of the present invention is to address some of the above problems and provide a more efficient and desirable process for filling a container with such products.

SUMMARY OF THE INVENTION

According to the invention there is provided a process for packing potato crisps into a box with a base and side-walls, the process comprising the steps of:

(i) dispensing potato crisps into the box through a delivery tube;

(ii) shaking the box to settle the potato crisps in the box; and (iii) foil-wrapping the box. The advantages of providing the above process is that the box protects the potato crisps from damage during storage and shipping, while wrapping the potato crisp-containing box with foil protects the potato crisps from damage by oxidation. Furthermore, the use of the box in packing potato crisps negates the use of a gas such as air or nitrogen gas to inflate the packaging which is generally used to both protect the product and prevent spoilage of the product therein. There is also substantially less empty space in the packaging meaning more product per unit area. This means that the packs so formed are extremely efficient from a space-saving standpoint. It involves a huge reduction in the cost of transport per unit weight of product (relative to the overall pack weight). The pack of the invention can be utilised with crisps made from slices of potato. As mentioned above such natural products become more non-uniform in size and shape during the frying process. Foil wrapping includes any suitable wrapping, and in particular films, that has a desired air (in particular) oxygen barrier to prevent the crisps losing their edible properties, for example going stale. It includes wrapping which is metallised or non-metallised such as metallised or non-metallised films. The wrapping may also be selected for its UV barrier properties again to prevent the crisps losing their edible properties. It will be appreciated that the box of the pack forms a substantial UV barrier.

A further inventive aspect of the present invention is the use of a settlement barrier which limits the amount of movement the crisps can undergo during settlement thereof. The settlement barrier allows for faster settlement of the crisps into the box while shaking is taking place. Indeed the settlement barrier may allow for closer spatial association of the crisps than would be achieved by shaking alone. This allows greater volume reduction for a given weight of crisps.

Accordingly one aspect of the present invention is a process for packing potato crisps into a box with a base and side-walls, the process comprising the steps of:

(i) dispensing potato crisps into the box;

(ii) shaking the box to settle the potato crisps in the box; and urging the crisps into the box while the box is being shaken. All other aspects of the invention described herein are applicable to this aspect of the invention also.

In an alternative or additional arrangement it is desirable that an urging force is applied to the crisps to urge them into a closer spatial association (pack more tightly). Such an urging force could be provided in addition to, or by, a settlement barrier which may be a pressing element. Desirably the urging force would apply a compacting pressure sufficient to urge crisps into a closer spatial association. The compacting pressure utilised is such that there is no, or substantially no, breakage of the crisps. A simple extending arm may be employed for this purpose but other advantageous arrangements are set out below.

Another embodiment of the invention is wherein step (i) further comprises
  (a) moving a delivery tube for the potato crisps to a potato crisps-dispensing position in which the tube extends into the open box; and
  (b) retracting the tube from the dispensing position.

The movement of the delivery tube to a potato crisps-dispensing position and retracting the tube again permits accurate delivery of a precise quantity of potato crisps to the box. Retraction may be effected as dispensing takes place. Retraction of the tube in this way can allow for over-filing of the box. (Before the crisps are settled they generally will occupy a greater volume). During subsequent settlement the crisps will be settled to a volume where they are accommodated within the box. It is desirable to overfill the box and then settle the product into the box. In this way more product is accommodated in the same volume. In particular the present invention is suited to packing of crisps made from slices of potato as the packing method helps to more tightly arrange the crisps within the box. This is achievable with substantially no breakage of the crisps.

A further embodiment of the invention is wherein the delivery tube comprises a potato crisps-dispensing end that is substantially rectangular in cross-section. The rectangular shape of the potato crisps-dispensing end of the delivery tube ensures that the potato crisps are delivered within the boundaries of the box. The shape (and size) of the dispensing end matching that of the box ensures that there is an even delivery of the potato crisps within the internal volume of the box. It also prevents the potato crisps from being delivered outside the boundaries of the box and provides an efficient and fast process for filling a box with potato crisps.

An alternate embodiment of the invention is wherein the delivery tube is cylindrical in cross-section above the dispensing end. In such an embodiment the tube can have, for example taper into, a rectangular delivery end.

The delivery tube may further comprise a trapdoor to hold the potato crisps (for example a one box fill amount of crisps) in the tube and which can be opened for dispensing the potato crisps into the box. The trapdoor provides a more controlled means of delivering the potato crisps thereto and may prevent overloading the box with potato crisps. The trapdoor ensures that only a predetermined weight of potato crisps is delivered to the box, thereby providing an efficient means of consistent delivery of a volume of potato crisps to a box.

The trapdoor may comprise at least one flap hingedly engaged with an inner wall of the tube.

Step (ii) may comprise mechanically shaking the potato crisps-containing box such so that all the potato crisps are within the box prior to step (iii). As potato crisps are a bulky product with a generally non-uniform shape, the initial delivery of a volume of potato crisps (for example from a weigh head via the delivery tube) to the box tend to be heaped up and outside the boundaries (in particular heaped above the top) of the side-walls of the box. When the box is moved to the shaking step the potato crisps are packed down into the box so that the volume of the delivered potato crisps is now within the boundaries of the box. This is advantageous in that it permits the potato crisps to settle into the box such that the potato crisps do not appear above the boundary of the box, thereby protecting the potato crisps from crushing during storage and shipping.

In one arrangement the mechanical settling is carried out while a box containing crisps are being moved along a production line. For example settling may occur during conveying of the product. For example the box/crisps may be vibrated whilst being conveyed. For example a vibrating conveyor may be employed.

In one simple arrangement the settlement barrier is stationary and the urging of the crisps is imparted by moving the box/crisps against the barrier. For example the settlement barrier may be a sloped surface which is arranged to progressively decrease a clearance distance between it and the top of the box. The effect then is to gradually push the crisps further into the box as the box moves against the barrier.

In one simple arrangement the lid of the box forms a settlement barrier. The lid is placed over the crisps and can be used to apply an urging force to urge crisps into a closer spatial association. For example, in an initially overfilled situation of the crisps, the lid is extended over the crisps as they protrude from the top of the box. While the box is vibrated an urging force is applied to the lid to push the crisps into the box and force the lid closed. This allows for the crisps to be urged into a closer spatial association while simultaneously closing the box. It is thus possible to conduct at least three actions at once, move the crisps/box along a production line; settle the crisps by shaking and furthermore closing the lid by using closing pressure of the lid to further urge the crisps into a closer spatial association. In one advantageous arrangement these three actions can be carried utilising a conveyor which is vibrated while conveying and which brushes the box against a settlement barrier which urges the crisps into the box and closes the lid.

Another embodiment of the invention is wherein the potato crisps are weighed in a weigh head prior to step (i).

It is desirable that the box is rectangular in shape.

An alternate embodiment of the invention is wherein the tube is telescopic and can be telescopically extended for delivery of the potato crisps. The telescopic movement of the delivery tube provides the means to permit the filling of the box with a predetermined weight of potato crisps that initially will be outside the boundaries of the box, which are then settled (to a position within the boundaries of the box) using the settling step of the process. Furthermore, the telescopic movement of the delivery tube extending into and retracting from the box speeds up the process of packing the box when the box moves from step (ii) to step (iii) of the process. Telescopic extension allows the crisps to be delivered to the box from a dispensing position of the tube where a dispensing end of the tube is within the box. Telescopic retraction can allow the tube to be withdrawn so that the box can be moved on.

It will be appreciated that the filling/wrapping described above is efficiently carried out as a continuous line process where successive boxes are filled, settled and wrapped.

According to the present invention there is also provided a pack comprising a box having a base and side-walls, potato crisps held within the box, and a foil wrapper about the box to hermetically seal the potato crisps in a box. The advantage of having a pack comprising the above is that it negates the current problems of (tube) bag-packed potato crisps in regard to crushing of the product during packing, shipping and storage. The box provides extra protection to the potato crisps, while the foil wrapper provides a hermetic seal to preserve the potato crisps and also protect them from degradation for example by oxidation. It also prevents discolouration of the crisps due to exposure to light. Furthermore, the pack is also of a convenient shape that maximises the packaging volume in a storage container for the packs when said packs are being shipped to a client or being sent to storage prior to shipping.

An alternate embodiment of the invention is wherein the box further comprises a lid which is closed before the foil wrapper is applied. The advantage of the lid lies in providing further protection to the potato crisps in the pack when said packs are being stored or shipped.

The present invention also relates to an apparatus configured to carry out the method of the present invention.

The invention extends to a method, machine and pack as shown in the accompanying drawings.

BRIEF DESCRIPTION OF THE DRAWINGS

FIG. 6 shows a top plan view of a series of four boxes (each respectively labelled 12a-12d) on the conveyor each at a different stage in the settlement/closing process.

FIG. 7 shows the same sequence of boxes—this time from an end view thereof.

DETAILED DESCRIPTION OF THE DRAWINGS

Figure 1:
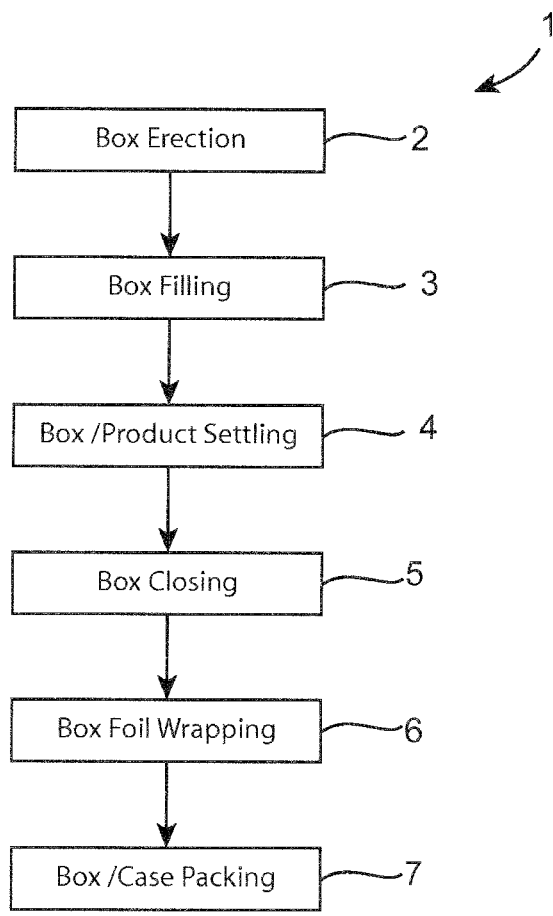
FIG. 1 is a schematic of the process of the present invention.
Figure 1A:
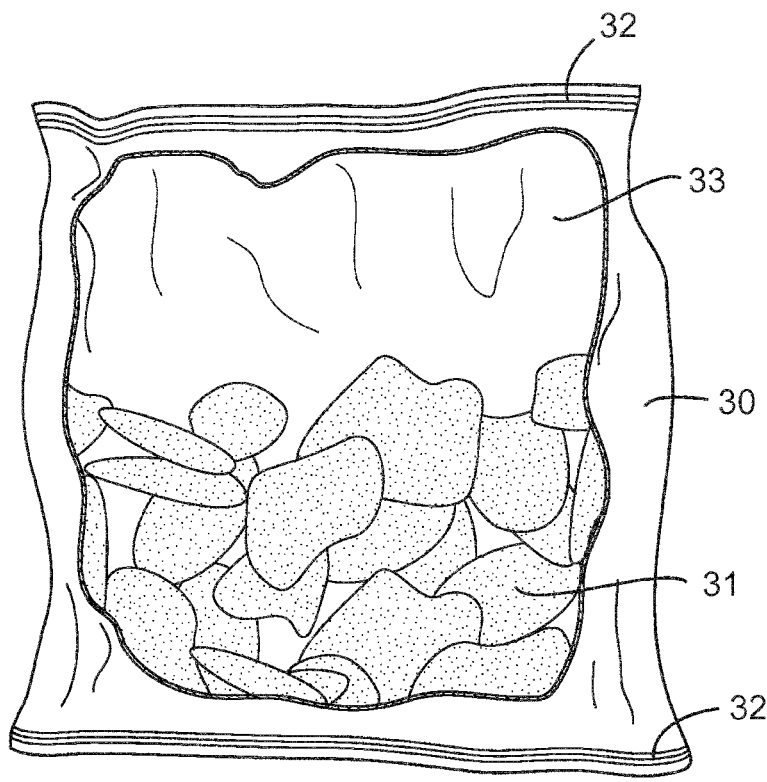
FIG. 1A (prior art) is a side part-sectional view of a conventional bag of crisps.

FIG. 1A (prior art) shows a conventional foil bag 30 containing crisps 31. The bag is sealed at opposing ends by heat seals 32. It will be appreciated that for protective purposes a substantive volume of the bag is unoccupied by crisps and instead is taken up with a gaseous atmosphere 33. This packing is extremely inefficient from a space saving point of view.

One embodiment of the present invention will now be described with respect to the Figures. FIG. 1 shows a schematic view of the process 1 of the present invention, wherein the process 1 comprises a box erection step 2, a box-filling 3 step, a box/product settling 4 step, a box foil wrapping 6 step, and a box/case packing step 7. Box erection is utilised to erect the box from a box blank.

Figure 2:
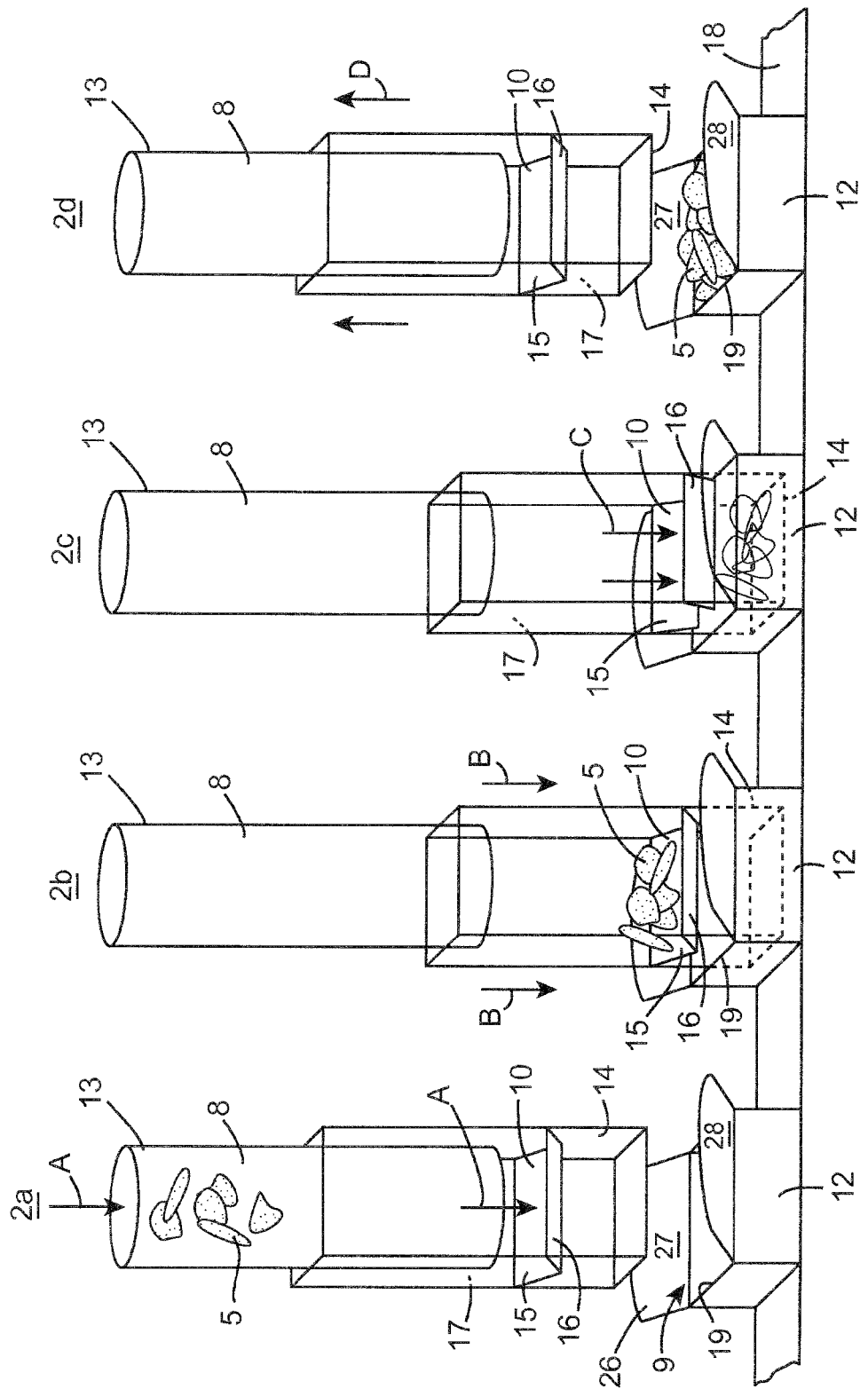
FIG. 2 is a schematic of the operation of the delivery tube used in the process of the present invention.
Figure 3:
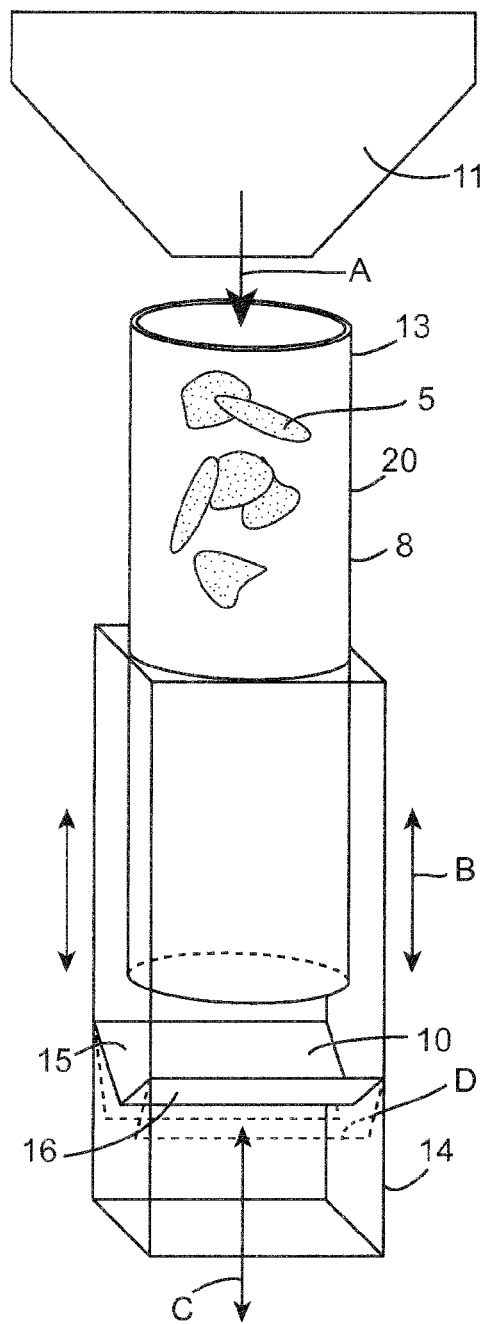
FIG. 3 is a schematic of the delivery tube used in the process of the present invention.

The box-filling 3 step is further outlined in FIG. 2 and FIG. 3. Specifically, the box 12 is placed under the delivery tube 8. In general the delivery tube 8 may take the form of a funnel. The potato crisps 5, are weighed in weigh head 11 (see FIG. 3), which is located above and over the potato crisps-receiving end 13 of the delivery tube 8. The weighed potato crisps 5 from the weigh head 11 enter the delivery tube 8 via an (upper) potato crisps-receiving end 13 and are prevented from being dispensed to the box 12 by trapdoor 10. The movement of the crisps 5 is indicated by arrows A in FIG. 2a. The trapdoor 10 is formed by a pair of flaps 15,16.

After receiving the potato crisps 5, the delivery tube 8 is telescopically extended in the direction of arrows B in FIG. 2b such that a (lower) potato crisps-dispensing end 14 of the delivery tube 8 dips into the box through opening 9 of the box 12 (FIG. 2b). The trapdoor 10 is released, with the flaps 15,16 lying essentially flush with an inner wall 17 of the potato crisps-dispensing end 14 of the delivery tube 8, allowing the potato crisps to drop into the box 12 as indicated by the arrows C (FIG. 2c). To facilitate complete filling of the box 12, the delivery tube 8 is telescopically retracted in the direction of arrow D (FIG. 2d), which further permits the box 12 to be conveyed to the next step of the process 1. The trapdoor 10 is reset, as is the entire device, to the configuration of FIG. 2a so as to allow the process to be repeated in a continuous cycle. A conveyor 18 conveys the box 12 along the production line. It will be appreciated that each of the steps of FIG. 2 can be accomplished by one dispensing apparatus and that FIG. 2 shows a sequence of actions of one dispensing apparatus. It will also be appreciated that an apparatus comprising multiple dispensing stations could be provided for simultaneously packing crisps into multiple boxes simultaneously could be employed. The conveyor need not move the box 12 during the filling process.

An enlarged view of the filling process in action is shown in FIG. 3 which also includes a weigh head 11 for weighing crisps to be dispensed. The arrow A indicates the direction of the movement of the crisp 5 from the weigh head 11. The arrows B indicate the up and down telescopic movement of the delivery tube 8 and the arrow C indicates up and down movement relative to the box 12. The flaps 15,16 are shown in the closed position and, also, in dashed outline, the open position.

Typically overfill will occur as the product in the dispensed unsettled form is heaped above the top of the box. This is best seen in FIG. 2d in which the box 12 is overfilled with crisps 5. The crisps 5 are heaped above a top edge 19 of the box 12. To ensure that the box 12 can be closed fully for example to be securely wrapped in a foil wrapper, the box 12 is shaken, for example at the box/product settling step 4 by mechanical means for example a motor powering an eccentric weight. The shaking of the box ensures that the volume/weight of potato crisps dispensed to the box do not interfere with the foil-wrapping step 6 of the process 1. The advantageous property of this step, in conjunction with the telescopic delivery tube 8, is that the box 12 can be initially filled with potato crisps 5 beyond the boundaries of the box 12, and when shaken, the potato crisps 5 are packed down to be within the boundaries of the box 12. This step ensures that the appropriate amount of potato crisps is packed within the box 12. It thus allows for complete filling of the box with product. A desired weight of crisps can thus be filled into a box that is initially overfilled.

Following the box/product settling 4 step, the box 12 is conveyed onto the box foil wrapping step 6. The box 12 is wrapped by conventional foil-wrapping techniques. The wrapped box 12 is then packaged into cases for storage and transport.

Looking now in more detail at the delivery tube 8 as shown in FIG. 3, the potato crisps-receiving end 13 is cylindrical in shape, while the potato crisps-dispensing end 14 is rectangular in shape to allow for a more efficient filling of the box 12. The potato crisps-dispensing end 14 is slidably engaged (telescopic) with the potato crisps-receiving end 13 such that the potato crisps-dispensing end 14 slides over and covers the outer wall 20 of the potato crisps-receiving end 13, as indicated by arrow D. This slidable engagement permits the dipping and retraction of the delivery tube 8 into and away from the open box 12 during the filling 3 step, as indicated by arrows B and C.

Within the potato crisps-dispensing end 14 of the delivery tube 8 is found a trapdoor 10, hingedly engaged with the inner wall 17 potato crisps-dispensing end 14. The trapdoor 10 holds the potato crisps in the delivery tube when released from the weigh head 11. When a predetermined weight of potato crisps are held by the trapdoor 10, the trapdoor 10 is opened to allow the potato crisps to drop, or be dispensed into the open-topped box 12.

Figure 4:
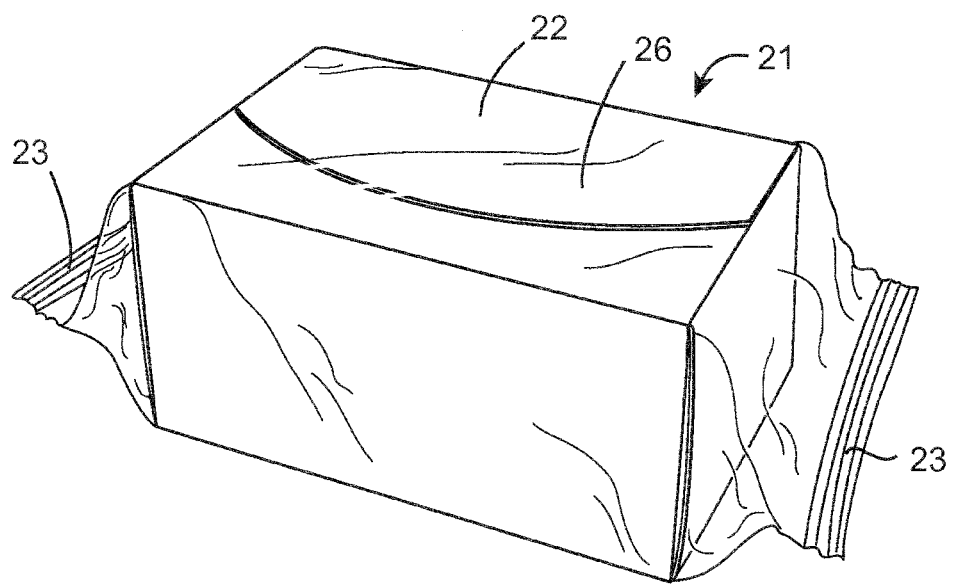
FIG. 4 is a schematic of the foil-wrapped pack of the present invention.

Referring now to FIG. 4, there is described a pack 21 comprising a box (it will be appreciated that the box will not be seen in any embodiment where the wrapping is substantially opaque) with side-walls and a base, potato crisps held within the box, and a foil wrapper 22 about the box to hermetically seal the potato crisps in a box. The hermetically sealed foil wrapper forms crimped seals 23 on either end of the pack 21. The box has an optional lid 26 (in addition to the side-walls and base) for providing extra protection for the potato crisps when held within the box and foil wrapper 22. In the embodiment the lid 26 is formed by opposing lid flaps 27,28. In the embodiment the foil-wrap is translucent so that the box can be seen through the foil.

It will be appreciated that the filled box can be shaken at any time after crisps have been delivered into it for settlement purposes. Desirably the settlement is provided by a mechanical shaking. One simple embodiment is where a shaking action is imparted to the box 12 from a conveyor 18 on which the box is conveyed. The conveyor may itself have a shaking/vibrating action or shaking/vibration force can be transmitted theretor by any appropriate means.

Figure 5:
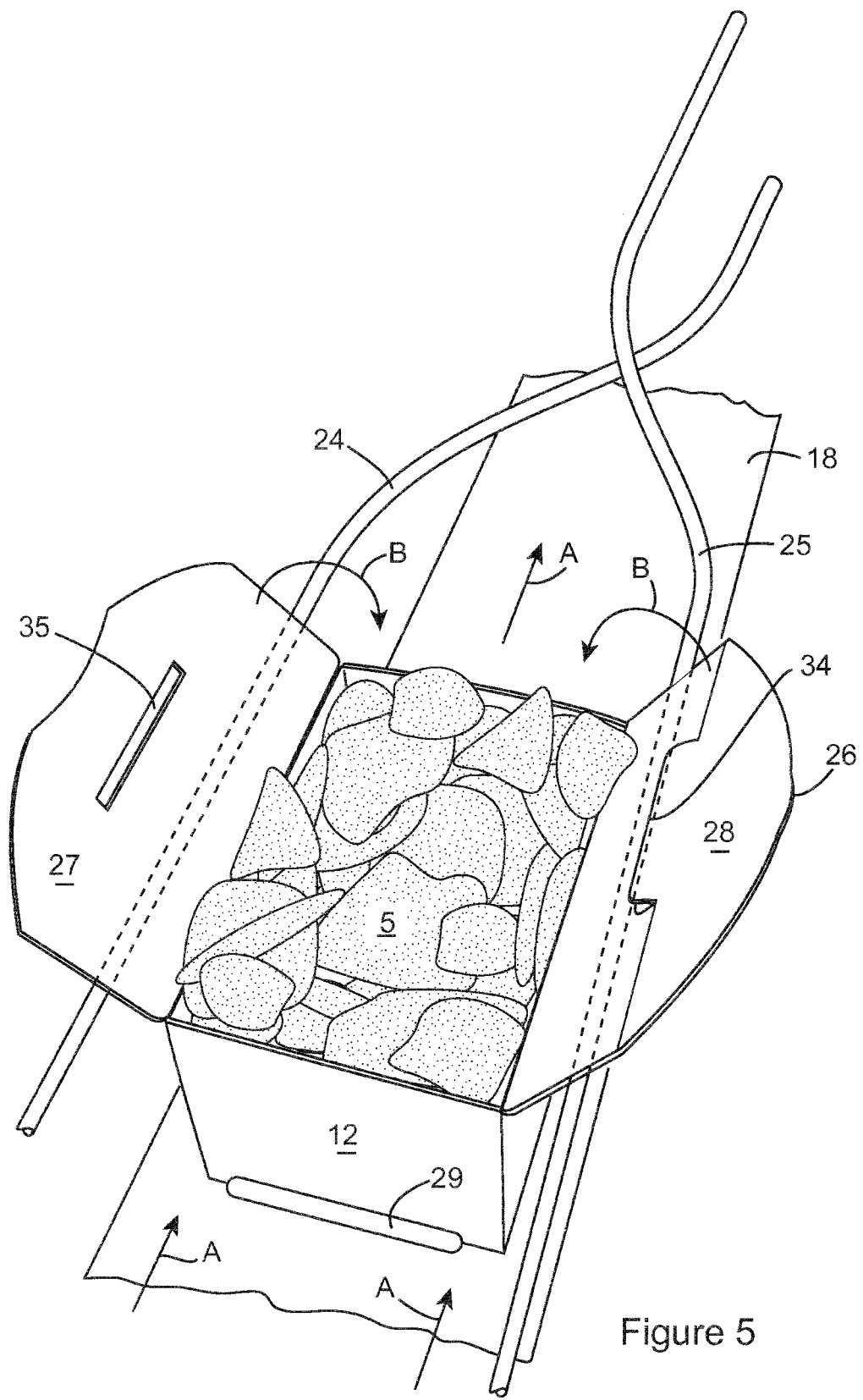
FIG. 5 shows a top perspective view of an (overfilled) box being conveyed along a production line.

FIG. 5 shows a top perspective view of an (overfilled) box 12 being conveyed along the conveyor 18. In the embodiment a tooth or grip 29 is provided on the conveyor 18 to catch the box 12 for conveying thereof. It is a desirable arrangement to have mechanical settling carried out while the box containing crisps is being moved along a production line as this is a very time efficient arrangement. It is further desirable to provide a settlement barrier to limit the degree of movement available to the crisps 5. It is desirable that the settlement barrier limits the degree of movement of the crisps 5 above the top of the box. In the embodiment the lid 26 is used as a settlement barrier. As seen in FIG. 5 as the box is moved along in the direction of arrows A the lid 26, and in particular each flap 27, 28 meets respective guides in the form of rails 24,25. Te rails 24,25 case the respective flaps 27,28 to progressively flip over and press against any crisps 5 which are outside the bounds of the dimensions of the closed box. Because the flaps 27,28 interlock in a desired manner by a tab insert 34 on flap 28 inserting and engaging within an aperture 35, it is desirable to fold over first flap 27 and then flap 28 to engage with flap 27. The rails 24,25 achieve this consecutive folding. The rails 24,25 each form a sloped surface which is arranged to progressively decrease a clearance distance between it and the top of the box. The effect then is to gradually further close the lid to press it against the crisps to push the crisps further into the box as the box moves against (and past) the barrier. This means that the lid 26 is placed over the crisps and can be used to apply an urging force to urge crisps 5 into a closer spatial association. For example in an initially overfilled situation the crisps the lid is extended over the crisps as they protrude from the top of the box. While the box is vibrated an urging force is applied to the lid to push the crisps into the box and force the lid closed. This allows for the crisp to be urged into a closer spatial association while simultaneously closing the box. It is thus possible to conduct at least three actions at once, move the crisps/box along a production line; settle the crisps by shaking and furthermore close the lid by using closing pressure of the lid. In the present embodiment these three actions can be carried utilising the conveyor which is vibrated while conveying and which brushes the box 12 against the rails 24,25 (the rails forming urging means) to close the lid 26 (the lid forms a settlement barrier) which in turn urges the crisps into the box and closes the lid.

FIG. 6 shows a top plan view of a series of four boxes (each respectively labelled 12a-12d) on the conveyor each at a different stage in the settlement/closing process. The same sequence is shown in end view in FIG. 7. The sequence progresses from right to left in FIG. 6 as indicated by arrows A. A conveyor 18 conveys the boxes along. Wavy lines 38 indicate shaking (vibration) being imparted to the boxes by the conveyor. A first box 12a is just after being (over)filled as described earlier. A second box 12b is further along the line and has already encountered rails 24,25 which flip over (see arrow B) firstly flap 27 and then (as in the case of box 12c) flap 28 (see arrow C) to close the box. The rails 24,25 use the lid 26 to progressively press the crisps 5 into the dimensions of the closed box. As indicated even after being closed pressure may still be imparted to the lid of the box (in the embodiment by rail 25). This means that the box is pressed firmly shut and the crisps 5 are sufficiently settled to no longer interfere with closure of the box. The lid is firmly closed. The box then moves to a wrap station 40 where it is foil wrapped as in the case of box 12d which has already been wrapped. This forms the pack 21 as illustrated in FIG. 4.

FIG. 7 shows an end elevational view of each of the four boxes 12a-12d in the same sequence of closing.

Figure 8:
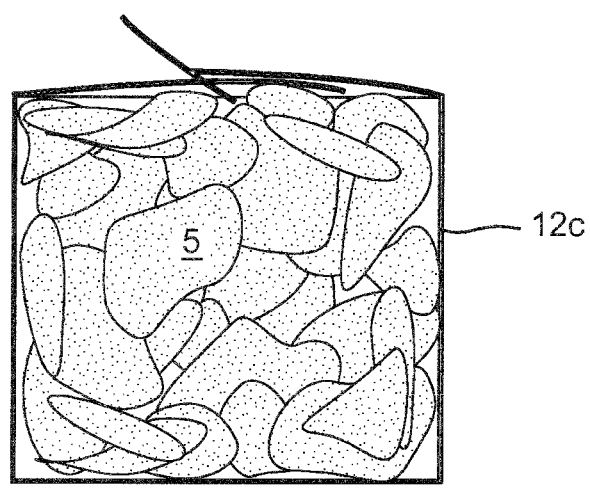
FIG. 8 shows a sectional view of a filled and closed pack of the type resulting from the sequence of FIGS. 6 and 7.

FIG. 8 shows a sectional view of a box of the type shown in FIGS. 6 and 7 as 12c with a closed lid and crisps 5 snugly packed within the box. As can be contrasted with the bag of FIG. 1A the box is filled with crisps while a substantial portion of the bag is unfilled. The invention thus greatly increases the volume of crisps that can be packed per unit volume of packing.

Figure 9:
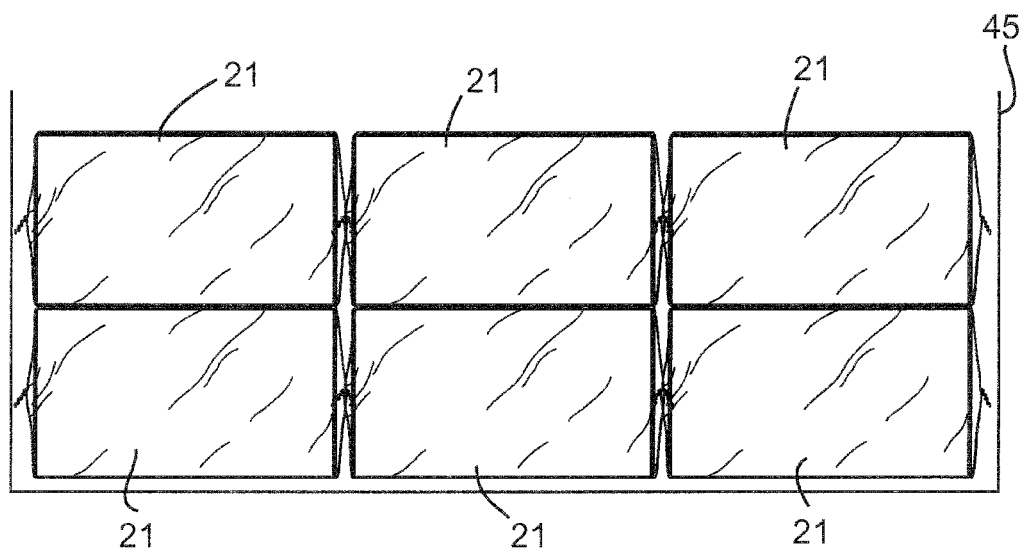
FIG. 9 shows a side view of six of a series of packs which have been formed according to the invention packed within an outer carton.

FIG. 9 shows a side view of six of a series of packs 21 which have been formed according to the invention packed within an outer carton 45. Again as can be seen there is little lost space with substantially the entire volume of the carton being taken up with the packs 21.

Figure 10:
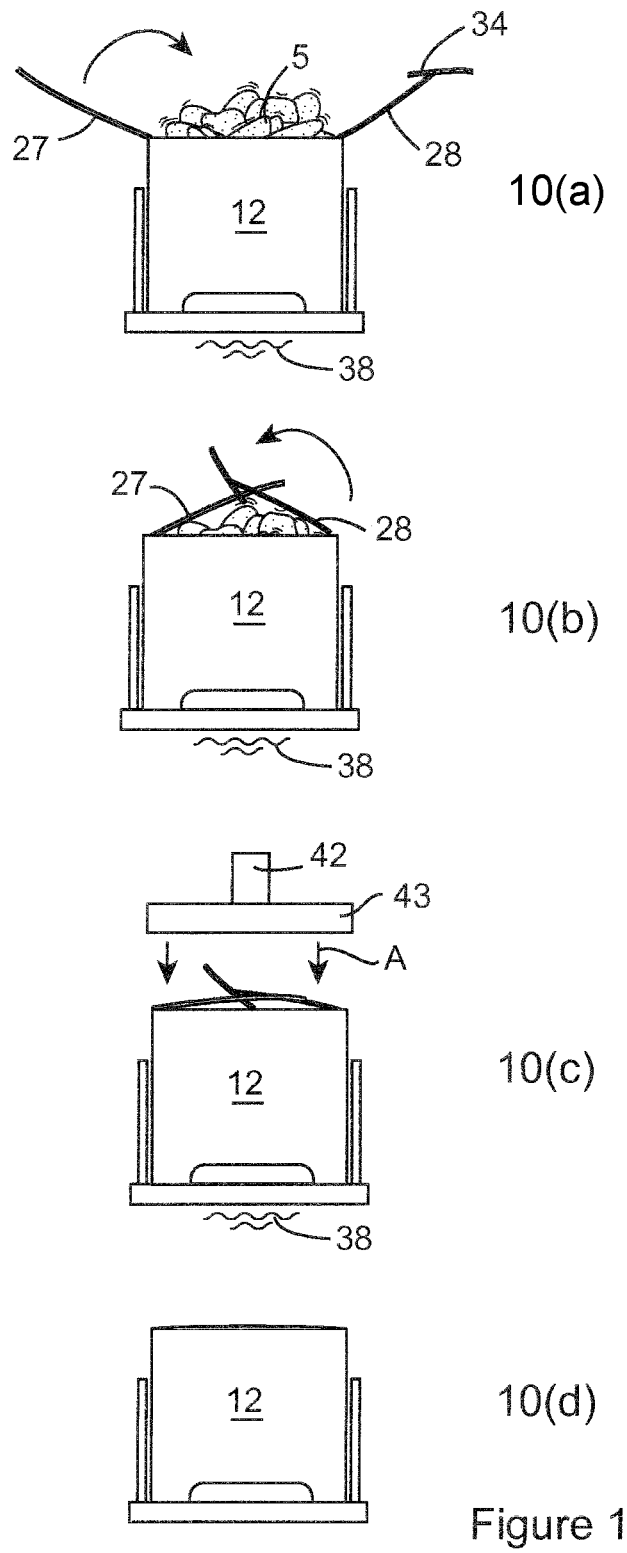
FIG. 10 shows an alternative closing arrangement (shown in a series of side views 10(a) to 10(d)) for boxes filled according to the present invention.

FIG. 10 shows an alternative closing arrangement for boxes filled according to the present invention. The sequence runs from top to bottom—FIGS. 10(*a*) to 10(*d*) showing a box 12 in a closing sequence. The box 12 is initially overfilled with crisps 5 (as indicated earlier). The box is vibrated as indicated by wavy lines 38. Flaps 27 and 28 are flipped across by any suitable means to the position shown in FIG. 10 (*b*). While vibration is still applied an urging arm 42 applies a closing pressure [as indicated by arrows A in FIG. 10(*c*)] to the box 12 and in particular the lid thereof. As in previous embodiments the closing pressure is such to help snugly pack the crisps within the box 12 and is such as not to cause any substantial breakage of the crisps 5. The arm 42 has a pressing element in the form of a plate 43 attached thereto which is adapted to press on the lid of the box.

In the context of the above-described embodiment, the term "potato crisps" refers to a thin slice of potato, deep fried or baked until crisp, and also encompasses potato crisps made by extruding or pressing a dough made from ground potatoes into specific shapes before frying. Furthermore, it is also understood that the term "potato crisps", commonly used in Europe and elsewhere, and the term "potato chips", commonly used in the United States of America, are interchangeable in the context of the present invention.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The invention claimed is:

1. A process for packing potato crisps into a box with a base, a lid and side-walls, the process comprising the steps of:
   (i) providing potato crisps, which are non-uniform thin slices of potato, deep fried until crisp and taken from differently sized and shaped potatoes and which have become even more non-uniform while being fried;
   (ii) weighing the potato crisps in a weigh head and dispensing the weighed potato crisps into the box, so that overfill occurs and the potato crisps are heaped above a top edge of the box;
   (iii) shaking the box to settle the potato crisps in the box while urging the crisps into the box using an urging force applied by the lid of the box, the urging force applying a compacting pressure sufficient to urge the crisps into a closer spatial association, so that the delivered potato crisps comprising the overfilled potato crisps are within the boundaries of the box; and
   (iv) foil-wrapping the box,
   so as to form, in a continuous line process, packs comprising (a) the box having a base and side-walls; (b) the potato crisps held within the box, and (c) a foil-wrapper about the box to hermetically seal the potato crisps in the box.

2. The process according to claim 1, wherein the step of dispensing further comprises:
   (a) moving a delivery tube for the potato crisps to a potato crisps-dispensing position in which position the tube extends into the open box, and
   (b) retracting the tube from the dispensing position.

3. The process according to claim 2, wherein the delivery tube comprises a potato crisps-dispensing end that is substantially rectangular in cross-section.

4. The process according to claim 2, wherein the delivery tube is cylindrical in cross-section above the dispensing end.

5. The process according to claim 2, wherein the delivery tube further comprises a trapdoor to hold the potato crisps in the tube and which can be opened for dispensing the potato crisps into the box.

6. The process according to claim 5, wherein the trapdoor comprises at least one flap hingedly engaged with an inner wall of the tube.

7. The process according to claim 1, wherein step (iii) comprises mechanically shaking the potato crisps-containing box such that all the potato crisps are within the box prior to step (iv).

8. The process according to claim 1, wherein the box is rectangular in shape.

9. The process according to claim 2, wherein the tube is telescopic and can be telescopically extended for delivery of the potato crisps.

10. The process according to claim 1, wherein the box further comprises a lid and the urging force is applied by an arrangement that urges the lid of the box closed against the crisps.

11. The process according to claim 1, wherein the urging force is applied by an arrangement that comprises a settlement barrier which is stationary and the urging of the crisps is imparted by moving the box/crisps against the barrier.

12. The process according to claim 1, further comprising using the urging force to urge the crisps into the box while the box is being shaken.

* * * * *